March 14, 1933.  F. GORSCHLUETER ET AL  1,900,988
STEEL VESSEL AND METHOD OF PRODUCING SAME
Filed June 3, 1929
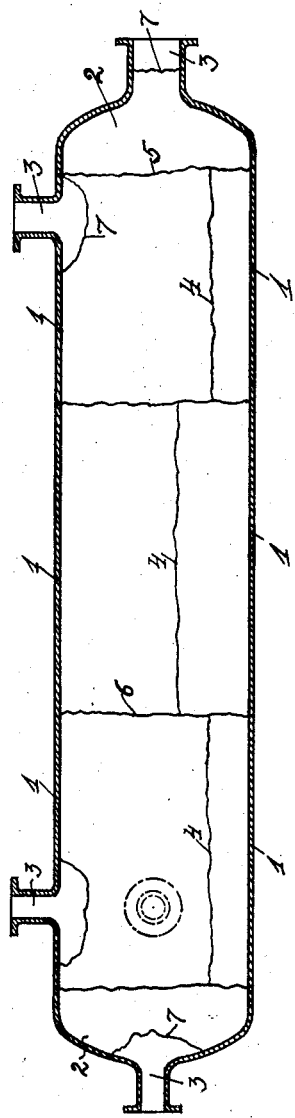
Inventor
Fritz Gorschlueter
& Ernst Pohl.
By
Attorney Patented Mar. 14, 1933

1,900,988

UNITED STATES PATENT OFFICE

FRITZ GORSCHLUETER AND ERNST POHL, OF BORSIGWERK, GERMANY, ASSIGNORS TO BORSIGWERK AKTIENGESELLSCHAFT, OF BORSIGWERK, GERMANY, A CORPORATION OF GERMANY

STEEL VESSEL AND METHOD OF PRODUCING SAME

Application filed June 3, 1929, Serial No. 368,182, and in Germany March 28, 1927.

This invention relates to tanks or vessels which are adapted to contain fluids and which are subjected in use to high pressures and high temperatures.

For approximately the past ten years, the development of the industrial and chemical arts has been largely centered around the application of temperatures and pressures extremely high in comparison to those previously used and one of the greatest problems incident to this progressive step has been the production of apparatus capable of withstanding the new high temperatures and pressures.

The problem was found to be particularly acute in the manufacture of tanks, vessels or containers adapted to withstand the abnormal pressure and temperature conditions; for the material formerly used for that purpose, ordinary low carbon steel, was found to be lacking in a number of respects.

It was first discovered that an unusually great decrease in the yield point of low carbon steel occurred when that substance was elevated to high temperatures. Experiment has shown a decrease of approximately 33⅓% in the yield point between the temperatures of 300° C. and 500° C. alone and it was therefore necessary to build tanks capable of withstanding these temperatures, of great wall thickness in order to obtain the necessary factor of safety.

This practice occasioned not only a large loss in amount of material used but presented new problems in the manufacture of tanks from plate of such thickness that ordinary hammer welding could only be effected at great labor and expense, and costly riveting had to be resorted to in many instances inasmuch as the plates were too thick to be successfully electrically welded.

It was thereafter proposed to use an alloy steel having approximately 3% to 5% nickel. Such a steel was found to have a relatively high yield point between temperatures of 300° C. to 500° C. and a decrease in wall thickness was hence permissible in the use of this alloy over the low carbon steel. However, it was found impossible to weld the nickel steel by means of the hammer weld process and this alloy could therefore not be used in the manufacture of welded tanks. Also, the cost of the nickel was so great that tanks made of the nickel steel were more expensive to manufacture than tanks made of carbon steel despite the decrease in wall thickness.

Another great disadvantage incident to the use of low carbon steel for boiler plate is its inclination for aging. Aging is the property of a steel to get brittle a long time after the steel has been worked cold and the length of this intervening period is considerably reduced when the steel has been heated to temperatures even as low as 200° C. Many boiler defects noted in the past twenty years have been traced back to this property of the low carbon steel and it is therefore of great importance to the industry to have a material which has no or practically no inclination to age.

It is an object of the present invention to provide a material for the building of tanks and the like having a high yield point at high temperatures, little or no inclination for aging, and which may be worked and welded as readily as any good weldable ingot iron.

Another purpose of the invention is the provision of tanks and the like capable of withstanding abnormally high pressures and without having excessive wall thickness.

Still another object of the invention is the provision of similar tanks and the like having little or no inclination for aging.

These and other objects of the invention will become more readily apparent upon a study of the following description when read in connection with the accompanying drawing which forms a part thereof.

In the drawing:

Fig. 1 is a longitudinal cross section through a vessel formed according to our invention.

Fig. 2 is a transverse section of the same.

The present invention is based upon the discovery that certain molybdenum alloy steels have an unexpectedly high yield point at high temperature and that such alloys may be readily hammer welded or otherwise worked by methods heretofore employed when using the ordinary low carbon steel, and that a hammer welded container which has far greater strength at high temperatures than tanks or vessels made from the steels employed in the prior art could be readily made therefrom.

The proportions of the principal constituents of the alloy used, exclusive of the iron, are preferably as follows:

| | Per cent |
|---|---|
| Carbon | .05 to .25 |
| Molybdenum | .2 to .5 |
| Aluminum | .05 to .2 |

The manufacture of this alloy does not differ materially from the processes now used in the production of other steels. The molybdenum is added in the furnace either as ferromolybdenum or as calciummolybdat. It may also be added in the ladle but only in the form of ferromolybdenum. The aluminum is added in the ladle and in the case of electric furnaces, it may be added in the oven after the reduction is completed.

The carbon content is necessarily held low in order that the alloy may readily be worked and easily welded when heated with water gas or coke. The molybdenum serves to impart high mechanical resistance to the alloy at high temperatures and the aluminum acts to prevent or reduce aging to a minimum. After the alloy has been made, the metal is cast and rolled into sheets from which plates of appropriate size are cut. These plates are then raised to welding temperature either by means of a coke fire or by use of a suitable gas, preferably water gas, and are hammer-welded together to form vessels of the desired shape and size. The metal may also be cast into plates of such shapes that they may be used directly in the fabrication of such vessels.

The drawing shows a vessel formed according to the invention. All the parts of this vessel are made preferably from the alloy disclosed above, and all the seams are heated by water gas and hammer welded. The plates 1 are first bent to semi-cylindrical shape and are welded to form cylindrical sections along the lines 4. These sections are annealed and are next welded together along the lines 6. The ends 2 are pressed to shape and are welded to the cylinder sections along lines 5. Pipe receiving sections 3 are then secured in place as shown by welding on the lines 7. The whole container is finally annealed and is ready for use.

The resulting product is made from a steel having a yield point from 60% to 100% higher than that of ordinary low carbon steel and having little inclination to age, and a tank made of this alloy offers greater safety for several reasons. Danger of local over-heating is minimized because of better heat passage through the thin walls as compared to the relatively thick walls required in the use of ordinary boiler plate. Also, there is less sensitiveness against overstraining the material either during the period of manufacture or during operation.

Further utility lies in the process of manufacture of containers capable of withstanding high temperatures and pressures made from the molybdenum-aluminum alloy. Inasmuch as the yield point of this alloy is relatively high at high temperatures, a relatively small allowance for decrease in yield point at these temperatures need be made in computing the required wall thickness where the alloy is used, as compared to the liberal allowance that must be made in the case of ordinary low carbon steel. As a consequence, tanks made from the molybdenum-aluminum steel can be made of greatly reduced wall thickness as compared to tanks made from the ordinary low carbon steel and it has been found this reduction is so material that the tanks made from the alloy can be readily welded whereas the high pressure and temperature tanks made from the low carbon steel were necessarily of such great thickness that they could not be readily welded.

As determined by actual test, vessels of a given strength require but two-thirds of the wall thickness when made of molybdenum steel as compared to vessels made of ordinary boiler plate. The cost of the alloy is but approximately 25% greater than that of the boiler plate so that a saving of about 20% in cost of materials, based on present market prices, is effected when the alloy is used, in addition to the great saving in labor incident to the handling and working of the thinner as compared to the thicker plates.

Having thus described my invention, what I now claim as new and desire to secure by Letters Patent of the United States is as follows:

1. Molybdenum-aluminum steel having a high yield point and little inclination to aging containing substantially .2% to .5% molybdenum, and at least 0.5% but less than .1% aluminum.

2. As a product of manufacture, a hollow body adapted for use under high pressure and temperature conditions, said hollow body being made of a steel alloy having a high yield point and little inclination to aging containing as its principal constituents, exclusive of iron, substantially .05% to .25% carbon, .2% to .5% molybdenum, and .05% to .2% aluminum.

3. As a product of manufacture, a vessel adapted for use under high temperature and pressure conditions, the said vessel being formed of welded steel plates having a high yield point and little inclination to aging containing substantially .05% to .25% carbon, .2% to .5% molybdenum, and at least .05% but less than .1% aluminum.

4. The method of making a hollow steel body adapted for use under high temperature and pressure conditions, which consists in making plate having a high yield point and little inclination to aging containing as its principal constituents, exclusive of iron, substantially .05% to .25% carbon, .2% to .5% molybdenum and .05% to .2% aluminum, and forming the hollow body from said plate.

5. The method of making a steel vessel adapted for use under high pressure and temperature conditions which consists in forming plates from steel having a high yield point and little inclination to aging containing a low percentage of carbon, .2% to .5% molybdenum and at least .05% but less than .1% aluminum, and welding said plates together to form a vessel.

6. The method of making a steel vessel adapted for use under high pressure and temperature conditions which consists in forming plates from steel having a high yield point and little inclination to aging containing as its principal constituents, exclusive of iron, .05% to .25% carbon, .2% to .5% molybdenum and .05% to .2% aluminum, heating said plates by the use of water gas, and hammer welding said plates to form a vessel.

7. Molybdenum-aluminum steel having a high yield point and little inclination to aging containing as its principal constituents, exclusive of iron, .2% to .5% molybdenum, .05% to .2% aluminum, and .05% to .25% carbon.

In testimony whereof, we have hereunto set our signatures.

FRITZ GORSCHLUETER.
E. POHL.